United States Patent
Whetsell et al.

(10) Patent No.: US 10,452,764 B2
(45) Date of Patent: Oct. 22, 2019

(54) SYSTEM AND METHOD FOR SEARCHING A DOCUMENT

(75) Inventors: Nathan Alexander Whetsell, New York, NY (US); Benjamin Stuart Whetsell, New York, NY (US)

(73) Assignee: Paper Software LLC, New York, NY (US)

( * ) Notice: Subject to any disclaimer, the term of this patent is extended or adjusted under 35 U.S.C. 154(b) by 230 days.

(21) Appl. No.: 13/546,469

(22) Filed: Jul. 11, 2012

(65) Prior Publication Data

US 2013/0019167 A1   Jan. 17, 2013

Related U.S. Application Data

(60) Provisional application No. 61/506,408, filed on Jul. 11, 2011, provisional application No. 61/534,515, filed on Sep. 14, 2011.

(51) Int. Cl.
*G06F 17/00* (2019.01)
*G06F 17/24* (2006.01)
*G06F 16/51* (2019.01)

(52) U.S. Cl.
CPC .............. *G06F 17/24* (2013.01); *G06F 16/51* (2019.01)

(58) Field of Classification Search
CPC .. G06F 17/21; G06F 17/211; G06F 17/30896; G06F 17/3028; G06F 17/30528; G06F 17/30699; G06F 17/24
USPC ................................................. 715/200, 255
See application file for complete search history.

(56) References Cited

U.S. PATENT DOCUMENTS

| | | | |
|---|---|---|---|
| 4,996,665 A | | 2/1991 | Nomura |
| 5,644,334 A | | 7/1997 | Jones et al. |
| 5,649,192 A | | 7/1997 | Stucky |
| 5,778,401 A | | 7/1998 | Beer et al. |
| 5,924,107 A | | 7/1999 | Fukao et al. |
| 5,940,842 A | * | 8/1999 | Sakuta .................. G06F 17/272 715/236 |
| 5,943,669 A | | 8/1999 | Numata |
| 6,067,531 A | | 5/2000 | Hoyt et al. |
| 6,366,906 B1 | * | 4/2002 | Hoffman ............... G06F 16/957 |
| 6,694,484 B1 | | 2/2004 | Mueller |
| 6,751,620 B2 | | 6/2004 | Orbanes et al. |
| 6,839,701 B1 | * | 1/2005 | Baer ................. G06F 17/30011 |
| 6,857,102 B1 | | 2/2005 | Bickmore et al. |
| 6,915,299 B1 | | 7/2005 | Arcuri et al. |
| 7,137,072 B2 | | 11/2006 | Bauer et al. |
| 7,165,221 B2 | * | 1/2007 | Monteleone ........ G06F 19/3418 715/738 |
| 7,231,386 B2 | | 6/2007 | Nonomura et al. |

(Continued)

OTHER PUBLICATIONS

Palmirani et al., Norma-System: A Legal Document System for Managing Consolidated Acts, Springer 2002, pp. 310-320.*

(Continued)

*Primary Examiner* — Cong-Lac Huynh
(74) *Attorney, Agent, or Firm* — Brian J. Colandreo; Jeffrey T. Placker; Holland & Knight LLP (57) ABSTRACT

A computer-implemented method and computing system are provided for defining a plurality of data groups. A set of rules may be associated with each of the data groups. The set of rules may define examples of items that should be included in each group. A document may be processed to identify elements within the document that adhere to a set of rules.

21 Claims, 6 Drawing Sheets

(56) References Cited

U.S. PATENT DOCUMENTS

| | | | |
|---|---|---|---|
| 7,340,674 B2 | 3/2008 | Newman | |
| 7,380,201 B2* | 5/2008 | Vasey | G06F 17/211 |
| | | | 715/200 |
| 7,418,660 B2 | 8/2008 | Hua et al. | |
| 7,428,699 B1 | 9/2008 | Kane et al. | |
| 7,475,333 B2 | 1/2009 | Otter et al. | |
| 7,475,337 B1 | 1/2009 | Huang | |
| 7,480,708 B2 | 1/2009 | Muehl et al. | |
| 7,496,837 B1 | 2/2009 | Larcheveque et al. | |
| 7,519,579 B2 | 4/2009 | Yalovsky et al. | |
| 7,562,085 B2* | 7/2009 | Bier et al. | |
| 7,644,360 B2 | 1/2010 | Beretich et al. | |
| 7,657,515 B1* | 2/2010 | Jewell | G06F 17/3066 |
| | | | 707/999.003 |
| 7,657,832 B1 | 2/2010 | Lin | |
| 7,689,933 B1 | 3/2010 | Parsons | |
| 7,865,820 B2 | 1/2011 | Sauer et al. | |
| 7,917,848 B2 | 3/2011 | Harmon et al. | |
| 8,095,575 B1 | 1/2012 | Sharma et al. | |
| 8,095,882 B2* | 1/2012 | Kashi | G06F 9/543 |
| | | | 379/93.07 |
| 8,108,768 B2* | 1/2012 | Petri | G06F 17/2205 |
| | | | 715/237 |
| 8,196,030 B1 | 6/2012 | Wang et al. | |
| 8,209,278 B1 | 6/2012 | Straus | |
| 8,224,785 B2 | 7/2012 | Myers et al. | |
| 8,380,753 B2 | 2/2013 | Mansfield et al. | |
| 8,397,155 B1 | 3/2013 | Szabo | |
| 8,423,471 B1 | 4/2013 | Emigh et al. | |
| 8,479,092 B1 | 7/2013 | Pandey | |
| 8,745,488 B1 | 6/2014 | Wong | |
| 8,762,411 B2 | 6/2014 | Poon et al. | |
| 8,826,173 B2* | 9/2014 | Bay | G06F 19/322 |
| | | | 715/200 |
| 8,886,676 B2 | 11/2014 | Mansfield | |
| 8,892,591 B1* | 11/2014 | Haugen | G06F 17/30864 |
| | | | 707/723 |
| 8,983,955 B2 | 3/2015 | Lessing et al. | |
| 8,984,396 B2 | 3/2015 | Tingstrom et al. | |
| 9,001,390 B1 | 4/2015 | Zernik | |
| 9,043,285 B2 | 5/2015 | Bekkerman | |
| 9,122,667 B2* | 9/2015 | Vasey | G06F 17/243 |
| 9,135,249 B2 | 9/2015 | Dejean | |
| 9,384,172 B2 | 7/2016 | Lukic et al. | |
| 9,400,790 B2 | 7/2016 | Yasrebi et al. | |
| 9,418,054 B2 | 8/2016 | Shaver | |
| 9,449,080 B1* | 9/2016 | Zhang | G06F 17/30657 |
| 9,489,119 B1 | 11/2016 | Smith, Jr. | |
| 9,519,872 B2* | 12/2016 | Griggs | G06Q 10/00 |
| 9,558,187 B2 | 1/2017 | Bastide et al. | |
| 9,639,510 B2 | 5/2017 | Isidore | |
| 9,719,702 B2 | 8/2017 | Murata et al. | |
| 9,773,119 B2 | 9/2017 | Sinha et al. | |
| 9,792,270 B2 | 10/2017 | Kloiber et al. | |
| 2001/0001857 A1 | 5/2001 | Kendall et al. | |
| 2001/0018739 A1 | 8/2001 | Anderson et al. | |
| 2002/0083096 A1 | 6/2002 | Hsu | |
| 2002/0129056 A1 | 9/2002 | Conant et al. | |
| 2002/0129066 A1 | 9/2002 | Milward et al. | |
| 2002/0184308 A1 | 12/2002 | Levy et al. | |
| 2002/0188627 A1 | 12/2002 | Bleizeffer et al. | |
| 2003/0018660 A1 | 1/2003 | Martin et al. | |
| 2003/0074345 A1* | 4/2003 | Baldwin et al. | 707/1 |
| 2003/0140053 A1* | 7/2003 | Vasey | G06F 17/243 |
| 2003/0196176 A1* | 10/2003 | Abu-Ghazalah | G06F 17/24 |
| | | | 715/273 |
| 2003/0200501 A1 | 10/2003 | Friebel et al. | |
| 2003/0220854 A1* | 11/2003 | Chu | G06Q 10/08 |
| | | | 705/30 |
| 2004/0006742 A1 | 1/2004 | Slocombe | |
| 2004/0015408 A1 | 1/2004 | Rauen, IV et al. | |
| 2004/0064480 A1 | 4/2004 | Bartlett et al. | |
| 2004/0068694 A1 | 4/2004 | Kaler et al. | |
| 2004/0083432 A1 | 4/2004 | Kawamura et al. | |
| 2004/0111675 A1 | 6/2004 | Mori et al. | |
| 2004/0205047 A1 | 10/2004 | Carpenter | |
| 2005/0010865 A1 | 1/2005 | Kuppusamy et al. | |
| 2005/0039118 A1 | 2/2005 | Gordon et al. | |
| 2005/0086598 A1 | 4/2005 | Marshall et al. | |
| 2005/0102612 A1 | 5/2005 | Allan | |
| 2005/0160379 A1 | 7/2005 | Roberts | |
| 2005/0187954 A1 | 8/2005 | Raman et al. | |
| 2005/0193330 A1 | 9/2005 | Peters | |
| 2005/0203924 A1 | 9/2005 | Rosenberg | |
| 2005/0210016 A1* | 9/2005 | Brunecky | G06F 17/30011 |
| 2005/0246631 A1 | 11/2005 | Mori et al. | |
| 2006/0010377 A1 | 1/2006 | Anecki et al. | |
| 2006/0034434 A1* | 2/2006 | Kashi | G06F 9/543 |
| | | | 379/93.07 |
| 2006/0047646 A1 | 3/2006 | Maluf et al. | |
| 2006/0080599 A1 | 4/2006 | Dubinsky | |
| 2006/0085765 A1 | 4/2006 | Peterson et al. | |
| 2006/0107200 A1 | 5/2006 | Ching | |
| 2006/0107251 A1 | 5/2006 | Boshier et al. | |
| 2006/0129569 A1 | 6/2006 | Dieberger et al. | |
| 2006/0161781 A1* | 7/2006 | Rice | G06F 21/645 |
| | | | 713/176 |
| 2006/0173813 A1* | 8/2006 | Zorola | G06F 17/30498 |
| 2006/0190816 A1* | 8/2006 | Vasey | G06F 17/2247 |
| | | | 715/205 |
| 2006/0206490 A1* | 9/2006 | Schiller | G06Q 10/10 |
| 2006/0242180 A1 | 10/2006 | Graf et al. | |
| 2006/0242549 A1* | 10/2006 | Schwier | G06F 3/1206 |
| | | | 715/201 |
| 2006/0271519 A1 | 11/2006 | Blackwood et al. | |
| 2007/0055679 A1 | 3/2007 | Yoshida et al. | |
| 2007/0185837 A1 | 8/2007 | Gurcan et al. | |
| 2007/0185846 A1* | 8/2007 | Budzik | G06F 17/30389 |
| 2007/0198952 A1 | 8/2007 | Pittenger | |
| 2008/0010605 A1 | 1/2008 | Frank | |
| 2008/0065973 A1 | 3/2008 | Schumacher et al. | |
| 2008/0104506 A1 | 5/2008 | Farzindar | |
| 2008/0114700 A1 | 5/2008 | Moore et al. | |
| 2008/0120376 A1 | 5/2008 | Allsop | |
| 2008/0163159 A1 | 7/2008 | Oara | |
| 2008/0168056 A1* | 7/2008 | Bluvband | G06F 16/3326 |
| 2008/0243786 A1* | 10/2008 | Stading | 707/3 |
| 2008/0281860 A1 | 11/2008 | Elias et al. | |
| 2009/0083612 A1* | 3/2009 | Baker | 715/200 |
| 2009/0119574 A1 | 5/2009 | Gitlin et al. | |
| 2009/0138466 A1* | 5/2009 | Henry | G06F 17/30017 |
| 2009/0144277 A1 | 6/2009 | Trutner et al. | |
| 2009/0144294 A1 | 6/2009 | Kemp | |
| 2009/0172773 A1* | 7/2009 | Moore | G06F 17/3089 |
| | | | 726/1 |
| 2009/0228777 A1* | 9/2009 | Henry et al. | 715/230 |
| 2009/0249178 A1 | 10/2009 | Ambrosino et al. | |
| 2009/0249181 A1* | 10/2009 | Bloom | 715/209 |
| 2009/0276378 A1 | 11/2009 | Boguraev et al. | |
| 2009/0281853 A1 | 11/2009 | Misvaer et al. | |
| 2009/0313236 A1* | 12/2009 | Hernacki | G06F 17/30796 |
| 2009/0327862 A1 | 12/2009 | Emek et al. | |
| 2010/0005058 A1 | 1/2010 | Tago et al. | |
| 2010/0005388 A1 | 1/2010 | Haschart et al. | |
| 2010/0041467 A1 | 2/2010 | St. John et al. | |
| 2010/0095202 A1 | 4/2010 | Ishizuka | |
| 2010/0100572 A1* | 4/2010 | Schiller | G06Q 10/10 |
| | | | 707/805 |
| 2010/0107059 A1 | 4/2010 | Suzumura et al. | |
| 2010/0121816 A1* | 5/2010 | Petri | G06F 17/30575 |
| | | | 707/610 |
| 2010/0174978 A1 | 7/2010 | Mansfield et al. | |
| 2010/0191748 A1* | 7/2010 | Martin | G06F 17/30675 |
| | | | 707/750 |
| 2010/0192358 A1* | 8/2010 | Lindberg | H02K 1/2733 |
| | | | 29/596 |
| 2010/0228734 A1 | 9/2010 | Murthy | |
| 2010/0268528 A1* | 10/2010 | Raskina | G06F 17/277 |
| | | | 704/9 |
| 2010/0281383 A1 | 11/2010 | Meaney et al. | |
| 2010/0306260 A1 | 12/2010 | Dejean | |

(56) References Cited

U.S. PATENT DOCUMENTS

| | | | |
|---|---|---|---|
| 2010/0318567 A1* | 12/2010 | Kuo | G06F 17/30675 707/780 |
| 2010/0332974 A1 | 12/2010 | Douglass | |
| 2011/0173528 A1 | 7/2011 | Zunger | |
| 2011/0231385 A1 | 9/2011 | Wang et al. | |
| 2011/0239101 A1 | 9/2011 | Rivers-Moore et al. | |
| 2011/0258173 A1* | 10/2011 | Ratiner | G06F 16/332 707/706 |
| 2011/0289105 A1* | 11/2011 | Hershowitz | 707/769 |
| 2012/0011475 A1 | 1/2012 | Hontz, Jr. | |
| 2012/0041955 A1 | 2/2012 | Regev et al. | |
| 2012/0054604 A1 | 3/2012 | Warncke-Wang | |
| 2012/0078934 A1* | 3/2012 | Goerke | G06K 9/00442 707/765 |
| 2012/0089903 A1 | 4/2012 | Liu et al. | |
| 2012/0095987 A1* | 4/2012 | Cheng | G06F 17/30442 707/713 |
| 2012/0143842 A1* | 6/2012 | Lacasse | 707/706 |
| 2012/0179684 A1* | 7/2012 | Alba et al. | 707/738 |
| 2012/0233171 A1* | 9/2012 | Richard | G06F 17/303 707/740 |
| 2012/0310663 A1* | 12/2012 | Jackson | G06Q 50/22 705/2 |
| 2012/0323919 A1* | 12/2012 | Alba et al. | 707/738 |
| 2013/0019151 A1 | 1/2013 | Whetsell et al. | |
| 2013/0019164 A1 | 1/2013 | Whetsell et al. | |
| 2013/0019165 A1 | 1/2013 | Whetsell et al. | |
| 2013/0097490 A1 | 4/2013 | Kotler | |
| 2013/0124975 A1 | 5/2013 | Lessing et al. | |
| 2013/0151564 A1 | 6/2013 | Brinkman | |
| 2013/0151974 A1 | 6/2013 | Cho et al. | |
| 2013/0185634 A1* | 7/2013 | Fox et al. | 715/256 |
| 2013/0198596 A1 | 8/2013 | Angelillo et al. | |
| 2013/0205197 A1 | 8/2013 | Wong | |
| 2013/0219483 A1* | 8/2013 | Cho | G06F 21/56 726/13 |
| 2013/0227406 A1 | 8/2013 | Mansfield et al. | |
| 2013/0238316 A1 | 9/2013 | Shastri et al. | |
| 2013/0294694 A1 | 11/2013 | Zhang et al. | |
| 2013/0339846 A1 | 12/2013 | Buscemi | |
| 2014/0006490 A1 | 1/2014 | Sethur et al. | |
| 2014/0012787 A1* | 1/2014 | Zhang | 706/12 |
| 2014/0013209 A1 | 1/2014 | Good | |
| 2014/0068400 A1 | 3/2014 | Gulezian et al. | |
| 2014/0082469 A1 | 3/2014 | Sitrick et al. | |
| 2014/0085323 A1 | 3/2014 | Wang et al. | |
| 2014/0222717 A1* | 8/2014 | Planitzer et al. | 705/36 R |
| 2014/0258832 A1 | 9/2014 | Hepp et al. | |
| 2015/0121335 A1 | 4/2015 | Braun et al. | |
| 2015/0242375 A1 | 8/2015 | Lessing et al. | |
| 2015/0363478 A1 | 12/2015 | Haynes | |
| 2016/0004820 A1* | 1/2016 | Moore | H04W 4/21 705/3 |
| 2016/0343404 A1 | 11/2016 | Roenning | |

OTHER PUBLICATIONS

Cederquist et al., Audit-based Compliance Control, Springer 2007, pp. 133-151.*
Agosti et al., A Two-level Hypertext Retrieval Model for Legal Data, ACM 1991, pp. 316-325.*
Moens et al., Abstracting of Legal Cases: The Salomon Experience, ACM 1991, pp. 114-122.*
Day et al., Mixed-Initiative Development of Language Processing System, ACM 1997, pp. 348-355.*
Yang et al., Interoperation Support for Electronic Business, ACM 2000, pp. 39-47.*
Can et al., Postal Address Detection from Web Documents, IEEE 2000, pp. 1-6.*
Algergaway et al., XML Data Clustering: An Overview, ACM 2011, pp. 25:1-25:41. (Year: 2011).*
Li et al., Text Document Clustering based on Frequent Word Meaning Sequences, Elsevier 2008, pp. 381-404. (Year: 2008).*
International Preliminary Report on Patentability for International Application No. PCT/US2012/046264 dated Jan. 23, 2014. 7 pages.
International Preliminary Report on Patentability for International Application No. PCT/US2012/046289 dated Jan. 23, 2014. 6 pages.
International Preliminary Report on Patentability for International Application No. PCT/US2012/046297 dated Jan. 23, 2014. 5 pages.
International Preliminary Report on Patentability for International Application No. PCT/US2012/046277 dated Jan. 23, 2014. 5 pages.
Chawathe et al., Change Detection in Hierarchically Structured Information, ACM 1996, pp. 493-504.
International Search Report and Written Opinion, dated Sep. 24, 2012, received in counterpart International Application No. PCT/US2012/046264, 9 pgs.
International Search Report and Written Opinion, dated Sep. 20, 2012, received in counterpart International Application No. PCT/US2012/046289, 7 pgs.
International Search Report and Written Opinion, dated Sep. 21, 2012, received in counterpart International Application No. PCT/US2012/046297, 6 pgs.
International Search Report and Written Opinion, dated Sep. 21, 2012, received in counterpart International Application No. PCT/US2012/046277, 6 pgs.
Navarro et al. Proximal Nodes: A Model to Query Document Database by Content and Structure, ACM 1997, 400-435.
Wang et al., Discovering Typical Structures of Documents: A Road Map Approach, ACM 1998, pp. 146-154.
Sarkar, et al., On the Reading of Tables of Contents, IEEE 2008, pp. 386-393.
Biagioli, et al., The NIR Project Standards and Tools for Legislative Drafting and Legal Document Web Publication, Google 2003, pp. 1-10.
Schweighofer, et al., Automatic Text Representation, Classification and Labeling in European Law, ACM 2001, pp. 78-87.
Sanderson, et al. Deriving Concept Hierarchies from Text, ACM 1999, pp. 206-213.
Cai, et al., Hierarchical Document Categorization with Suport Vector Machinesm, ACM 2004, pp. 78-87.
Non-Final Office Action issued in related U.S. Appl. No. 13/546,578 dated Sep. 11, 2015.
Non-Final Office Action issued in related U.S. Appl. No. 13/546,578 dated Oct. 23, 2014.
Final Office Action issued in related U.S. Appl. No. 13/546,578 dated Feb. 27, 2015.
Non-Final Office Action issued in related U.S. Appl. No. 13/546,516 dated Sep. 12, 2014.
Final Office Action issued in related U.S. Appl. No. 13/546,516 dated Mar. 18, 2015.
Non-Final Office Action issued in related U.S. Appl. No. 13/546,516 dated Sep. 29, 2015.
Non-Final Office Action issued in related U.S. Appl. No. 13/546,413 dated Dec. 4, 2015.
Final Office Action issued in related U.S. Appl. No. 13/546,413 dated Apr. 7, 2015.
Non-Final Office Action issued in related U.S. Appl. No. 13/546,413 dated Sep. 25, 2015.
Extended Search Report issued in related European Patent Application No. 12 810 545.9 dated Sep. 8, 2015.
Extended Search Report issued in related European Patent Application No. 12 810 920.4 dated Sep. 16, 2015.
Extended Search Report issued in related European Patent Application No. 12 81 0666.3 dated Sep. 16, 2015.
Katherine Murray, et al.,: "Microsoft Office Word 2007 Inside Out; Chapter 14" In: "Microsoft Office Word 2007 Inside Out; Chapter 14", Jan. 1, 2007 (Jan. 1, 2007), Microsoft Press, XP055212784, ISBN: 978-0-73-562330-9 pp. 382-401, the whole document* p. 384-p. 385* p. 391-p. 393* pp. 395, 398.
Anonymous: "How to automatically add paragraph numbering to Existing text in word or wordperfect?—AnandTech Forums", Nov. 19, 2002 (Nov. 19, 2002), XP055212761, Retrieved from the Internet: URL:http://forums.anandtech.com/showthread.php?t=927457 [retrieved on Sep. 11, 2015] *the whole document*.

(56) References Cited

OTHER PUBLICATIONS

Anonymouns: "Outline numbering (Word's Numbering Explained)", Jun. 29, 2011 (Jun. 29, 2011), XP055212757, Retrieved from the Internet: URL:http://web.archive.org/web/20110629211911/http://word.mvps.org/faqs/numbering/NumberingExplained/TypesOfNumbering/OutlineNumbering.htm [retrieived on Sep. 11, 2015] *the whole document*.

Extended Search Report issued in related European Patent Application No. 12 811 496.4 dated Sep. 16, 2015.

Anonymous: "Using QuickBullets (QuickNumbers) in WordPerfect < CompuSavvy's Word & WordPerfect Tips", Jan. 30, 2011 (Jan. 30, 2011), XP05521310, Retrieved from the Internet: URL:http://web.archive.org/web/20110130083808/http://compusavvy.wordpress.com/2010/06/20/using-quickbullets-quicknumbers-in-wordperfect/ [retrieved on Sep. 14, 2015] *the whole document*.

Final Office Action issued in related U.S. Appl. No. 13/546,578 dated Jun. 17, 2016.

Kummamuru et al., A Hierarchical Monothetic Document Clustering Algorithm for Summarization and Browsing Search Results, ACM 2004, pp. 658-665.

Patent Examination Report dated Aug. 8, 2016 in counterpart Australian Patent Application No. 2012281166.

Patent Examination Report dated Aug. 15, 2016 in counterpart Australian Patent Application No. 2012281151.

Non-Final Office Action issued in counterpart U.S. Appl. No. 13/546,578 dated May 5, 2017.

Patent Examination Report dated Jul. 6, 2017 in counterpart Australian Patent Application No. 2012281151.

Patent Examination Report No. 2 dated Jul. 25, 2017 in counterpart Australian Patent Application No. 2012281160.

Patent Examination Report dated Sep. 15, 2016 in counterpart Australian Patent Application No. 2012281160.

Patent Examination Report dated Aug. 1, 2016 in counterpart Australian Patent Application No. 2012282688.

Non-Final Office Action issued in related U.S. Appl. No. 13/546,413 dated Apr. 7, 2017.

Noll et al., Exploring Social Annotations for Web Document Classification, ACM 2008, pp. 2315-1209.

Wu, et al., Table of Contents Recognition and Extractors for Heterogeneous Book Documents, IEEE 2013, pp. 1205-1209.

Non-Final Office Action issued in counterpart U.S. Appl. No. 13/546,516 dated Apr. 10 2017.

Biagioli et al., Automatic Semantics Extraction in Law Documents, ACM 2005, pp. 133-140.

Dejean, Numbered Sequence Detection in Documents, Google Scholar 2010, pp. 1-12.

Final Office Action issued in counterpart U.S. Appl. No. 13/546,516 dated Nov. 16, 2017.

Romero, et al., Applying Web Usage Mining for Personalizing Hyperlinks in Web-based Adaptive Educational Systemsa, Elsevier 2009, pp. 828-840.

Final Office Action dated Dec. 18, 2017 in counterpart U.S. Appl. No. 13/546,578.

Final Office Action issued in counterpart U.S. Appl. No. 13/546,413 dated Nov. 2, 2017.

Patent Examination Report No. 2 dated Jul. 18, 2017 in counterpart Australian Patent Application No. 2012282688.

Patent Examination Report No. 2 dated Jul. 27, 2017 in counterpart Australian Patent Application No. 2012281166.

Examiner's Report issued in counterpart Canadian Patent Application No. 2,840,228 dated May 31, 2018.

Examiner's Report issued in counterpart Canadian Patent Application No. 2,840,233 dated Jun. 1, 2018.

Non-Final Office Action issued in U.S. Appl. No. 13/546,413 dated Jul. 2, 2018.

Gopal et al., Integrating Content-based Access Mechanisms with Hierarchical File Systems, Symposium on Operating Systems Design and Implementation 1999, pp. 1-15.

Non-Final Office Action issued in U.S. Appl. No. 13/546,516 dated Jul. 3, 2018.

Non-Final Office Action issued in U.S. Appl. No. 13/546,578 dated Jul. 26, 2018.

Examiner's Report issued in Canadian Application 2,840,231 on May 31, 2018.

Examiner's Report issued in Canadian Application No. 2,840,229 on May 31, 2018.

Final Office Action issued in U.S. Appl. No. 13/546,413 dated Apr. 12, 2019.

Final Office Action issued in U.S. Appl. No. 13/546,516 dated Apr. 29, 2019.

Final Office Action issued in U.S. Appl. No. 13/546,578 dated May 3, 2019.

Nation et al., Visualizing Websites Using a Hierarchical Table of Contents Browser: WebTOC, ScienceDirect 2003, pp. 199-210. (Year: 2003).

Notice of Allowance issued in U.S. Appl. No. 13/549,413 dated Jul. 11, 2019.

Schweighofer et al., Legal expert System KONTERM—Automatic Representation of Document Structure and Contents, Srpinger 2005, pp. 1-12, 2005.

Canada Examination Report issued in CA App, No. 2,840,228 dated May 23, 2019.

Canada Examination Report issued in CA App. No. 2,840,231 dated May 23, 2019.

Canada Examination Report issued in CA App. No. 2,840,229 dated May 30, 2019.

* cited by examiner

SYSTEM AND METHOD FOR SEARCHING A DOCUMENT

CROSS-REFERENCE TO RELATED APPLICATIONS

The application claims the benefit of U.S. provisional patent application Ser. No. 61/506,408 filed on 11 Jul. 2011, and also claims the benefit of U.S. provisional patent application Ser. No. 61/534,515 filed on 14 Sep. 2011 the entire disclosure of both of which applications are incorporated herein by reference.

TECHNICAL FIELD

This disclosure relates to document tools and, more particularly, to tools for processing and interacting with a document.

BACKGROUND

Many documents utilize a hierarchical organizational structure to improve comprehension and to allow for internal cross-referencing between the various sections of the document. While the hierarchical structure of a document may be useful for improving comprehension of the subject matter of the document, the management of the hierarchical structure during creation and editing of the document can present many challenges. For example, during editing of the document elements may be added at various levels of the hierarchical structure, new levels of hierarchy may be created and/or levels of the hierarchy may be removed, and elements may be moved within and/or between hierarchical levels. Such changes may impact portions of the document other than those being directly edited. The impacted portions of the document may be required to be updated in response to the edits, which may complicate the creation and editing process for the document.

SUMMARY OF DISCLOSURE

According to an embodiment, a computer-implemented method may include defining a plurality of data groups. The method may also include associating a set of rules with each of the data groups wherein the set of rules defines examples of items that should be included in each group. The method may further include processing a document to identify elements within the document that adhere to a set of rules.

One or more of the following features may be included. The data groups may include one or more of numbers, dates, times of day, units of time, money, and business entities. The set of rules may include a user editable set of rules. The document may include a legal agreement.

Processing the document may include processing the document to identify elements that adhere to a combination of two or more sets of rules. Processing the document may include processing the document to identify elements that adhere to a combination of one or more sets of rules and one or more user defined search terms. The method may further include providing a graphical indicator associated with elements within the document that adhere to the set of rules.

According to another embodiment, a computer program product may include a non-transitory computer readable medium having a plurality of instructions stored on it. When executed by a processor the instructions may cause the processor to perform operations including defining a plurality of data groups. Instructions may also be included for associating a set of rules with each of the data groups wherein the set of rules defines examples of items that should be included in each group. Instructions may further be included for processing a document to identify elements within the document that adhere to a set of rules.

One or more of the following features may be included. The data groups may include one or more of numbers, dates, times of day, units of time, money, and business entities. The set of rules may include a user editable set of rules. The document may include a legal agreement.

The instructions for processing the document may include instructions for processing the document to identify elements that adhere to a combination of two or more sets of rules. The instructions for processing the document may include instructions for processing the document to identify elements that adhere to a combination of one or more sets of rules and one or more user defined search terms. Instructions may further be included for providing a graphical indicator associated with elements within the document that adhere to the set of rules.

According to another embodiment, a computing system may include one or more processors that may be configured to define a plurality of data groups. The one or more processors may also be configured to associate a set of rules with each of the data groups wherein the set of rules defines examples of items that should be included in each group. The one or more processors may further be configured to process a document to identify elements within the document that adhere to a set of rules.

One or more of the following features may be included. The data groups may include one or more of numbers, dates, times of day, units of time, money, and business entities. The set of rules may include a user editable set of rules. The document may include a legal agreement.

The one or more processors configured to process the document may be further configured to process the document to identify elements that adhere to a combination of two or more sets of rules. The one or more processors configured to process the document may be further configured to process the document to identify elements that adhere to a combination of one or more sets of rules and one or more user defined search terms. The one or more processors may be further configured to provide a graphical indicator associated with elements within the document that adhere to the set of rules.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EXAMPLE EMBODIMENTS

Figure 1:
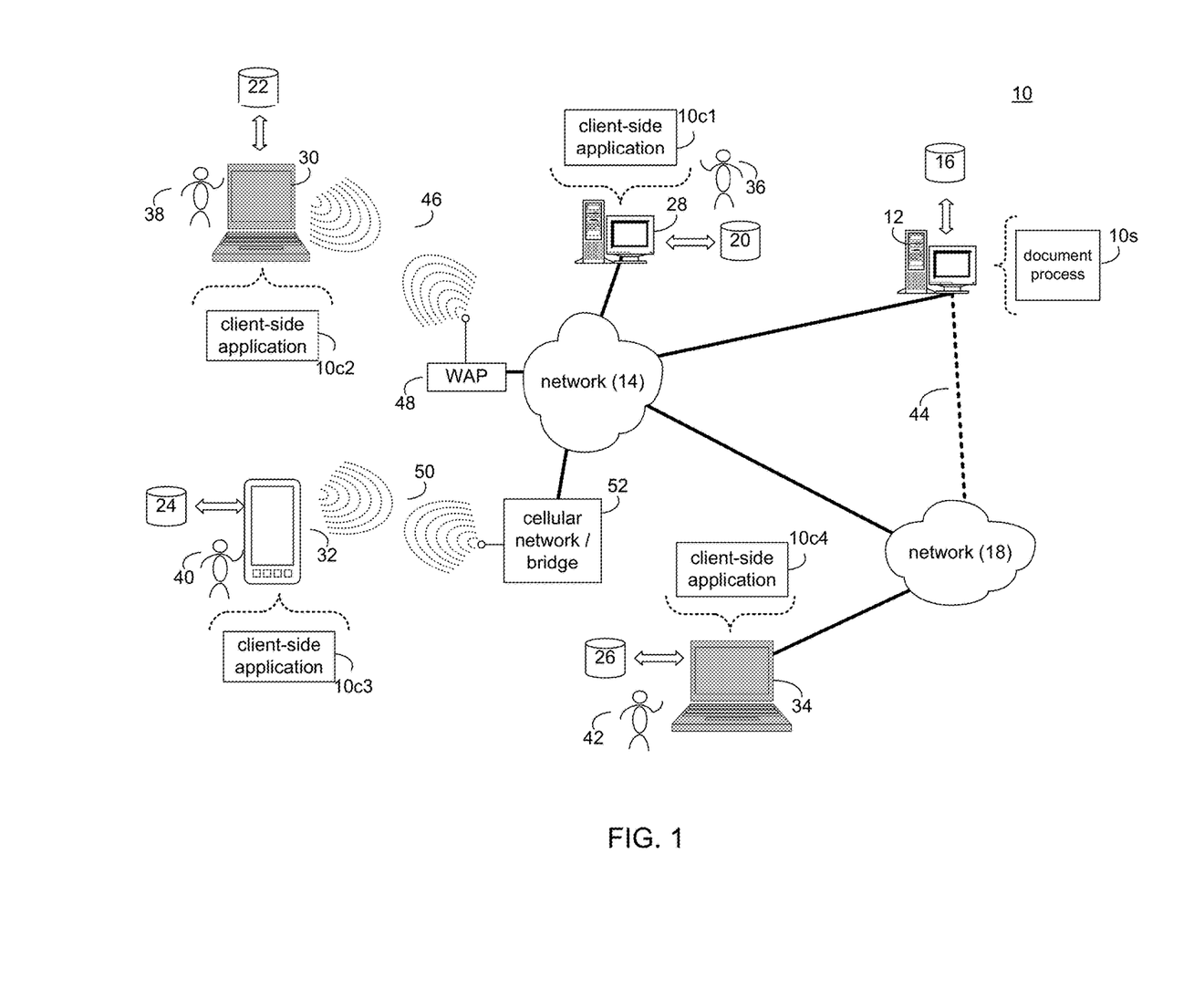
FIG. 1 is a diagrammatic view of a distributed computing network including a computing device that executes a document process according to an embodiment of the present disclosure.

Referring to FIG. 1, there is shown document process 10. For the following discussion, it is intended to be understood that document process 10 may be implemented in a variety of ways. For example, document process 10 may be implemented as a server-side process, a client-side process, or a server-side/client-side process.

For example, document process 10 may be implemented as a purely server-side process via document process 10s. Alternatively, document process 10 may be implemented as a purely client-side process via one or more of client-side application 10c1, client-side application 10c2, client-side application 10c3, and client-side application 10c4. Alternatively still, document process 10 may be implemented as a server-side/client-side process via event monitoring process 10s in combination with one or more of client-side application 10c1, client-side application 10c2, client-side application 10c3, and client-side application 10c4.

Accordingly, document process 10 as used in this disclosure may include any combination of document process 10s, client-side application 10c1, client-side application 10c2, client-side application 10c3, and client-side application 10c4.

According to various implementations and embodiments, document process 10 may define a plurality of data groups. Document process 10 may also associate a set of rules with each of the data groups. The set of rules may define examples of items that should be included in each group. Document process 10 may further process a document to identify elements within the document that adhere to one set of rules.

Document process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of document process 10s, which may be stored on storage device 16 coupled to computing device 12, may be executed by one or more processors (not shown) and one or more memory architectures (not shown) included within computing device 12. Examples of storage device 16 may include but are not limited to non-transitory computer readable mediums, such as a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., including an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access event process 10 directly through network 14 or through secondary network 18. Further, event process 10 may be accessed through secondary network 18 via link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. Additionally, personal computer 34 is shown directly coupled to network 18 via a hardwired network connection.

Figure 2:
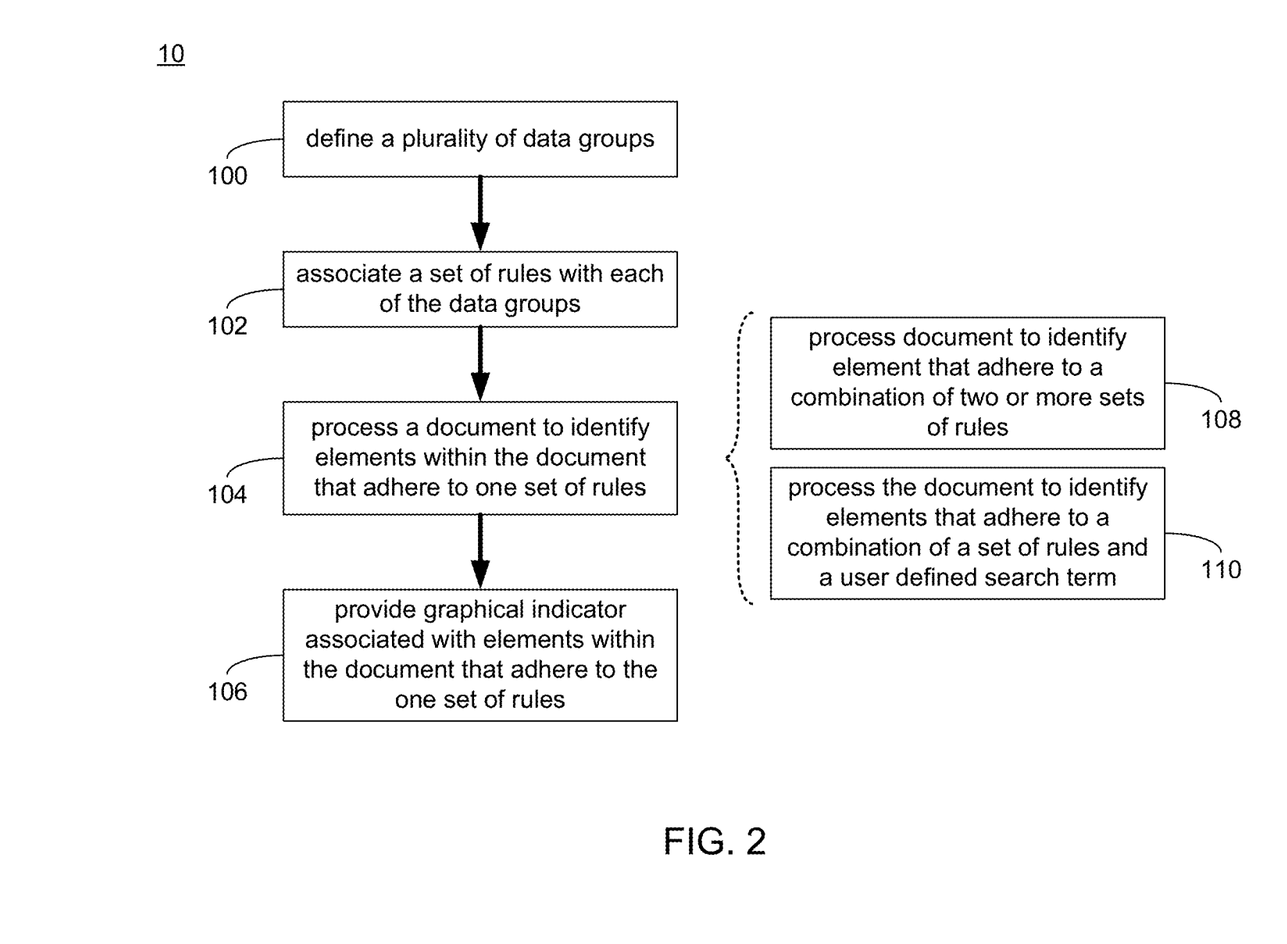
FIG. 2 is a flowchart of the document process of FIG. 1 according to an embodiment of the present disclosure.

Referring also to FIG. 2, in an example embodiment document process 10 may define 100 a plurality of data groups. Document process 10 may also associate 102 a set of rules with each of the data groups. The set of rules may define examples of items that should be included in each group. Document process 10 may further process 104 a document to identify elements within the document that adhere to one set of rules.

For example, document process 10 may facilitate searching a document to identify classes of information. For example, certain data types may be expressed using sequences of characters that may include different character types and/or expressions that may make searching a document for such data types difficult. Accordingly, in an example embodiment, data process 10 may define 100 a plurality of data groups. The data groups may include, but are not limited to, e.g., one or more of numbers, dates, times of day, units of time, money, and business entities.

For example, numbers may include digits, comma-separated numbers, decimals, percentages, and numbers in word form. Further, numbers may include combinations of various character types and expressions. For example, the cardinal number ten million may be expressed in words (e.g., ten million), in digits (e.g., 10000000), in comma-separated digits (10,000,000), in combinations of digits and words (e.g., 10 million), in combinations of digits and abbreviations (e.g., 10M, 10 M), and/or various other forms. Similarly, percentages may be expressed in various forms, e.g., 50%, 50 percent, fifty percent, fifty per centum, etc. Similarly, ordinal numbers may also be expressed in various forms. For example, fifty-eighth, 58$^{th}$, etc. Various other numbers may be similarly expressed in a variety of manners.

Dates may also be expressed according to a variety of formats and/or using a variety of character types. For example, the date Aug. 30, 2010 may be expressed in words (e.g., August thirtieth, twenty ten, August thirtieth, two thousand ten, etc.), as a combination of words and digits (e.g., August thirtieth, 2010, Aug. 10, 2010, etc.), and/or in a variety of numerical expressions (e.g., 8/30/10, 8/30/2010, 08/30/2010, etc.). Similarly, times of day may be expressed in a variety of manners including words, digits, and/or general expressions of time of day (e.g., 9:30 AM, 9:30 AM, 9:30 a.m., noon, afternoon, midnight, etc.). A variety of common expressions may also be used to express units of time (e.g., seconds, sec., minutes, min., hours, hrs., days, months, quarters, years, anniversary, etc.). Money may also be expressed in a variety of manners, including number expressions (e.g., as generally discussed above) in combination with a name, abbreviation, and/or symbol of a currency (e.g., $100, 100 dollars, one hundred dollars, 100 USD, etc.). Business entities may also be expressed using a variety of terms and/or abbreviations (e.g., LLC, Limited Partnership, GmbH, etc.).

Document process 10 may also associate 102 a set of rules with each of the data groups. The set of rules may define examples of items included in each group. The rules defining examples of items included in each group may include logic for defining examples of items to be included in each group. For example, and in a manner generally described above, document process 10 may associate 102 one or more rules with each data group, in which the one or more rules may define examples of items, and/or logic for identifying items that should be included within each data group. For example, each example data group (e.g., numbers, dates, times of day, units of time, money, and business entities) may include one or more rules that may define an example of items included in each group. For example, logic for identifying items that should be included in the numbers data group may include logic for identifying any digit and any word expression of a number. Other data groups may include similar lists of items that are included in the respective data groups. Further, document process 10 may also associate 102 one or more rules with one or more of the data groups that may define logic for identifying items included within the group. For example, document process 10 may associate 102 a rule with the number data group whereby any expression including a number (e.g., either digit or word expression of a number) in combination (e.g., including as a suffix and/or separated by a space) with a capital "M" or a capital "B" should include the capital "M" or capital "B" as part of the number expression. Various additional/alternative rule sets including logic for determining items included within the data group will be appreciated by those having skill in the art, and may similarly be utilized.

Further, in some embodiments, a set of rules associated 102 with a data group may include a set of rules for another data group, e.g., in combination with other criteria and/or otherwise modified. For example, one rule associated with a money data group may include the set of rules associated with numbers in combination with one or more rules including examples of currency names, symbols, and/or abbreviations. In a similar manner, document process 10 may associate 102 sets of rules with dates, times of day, and units of time in which at least a portion of the rules included within the sets of rules may incorporate the sets of rules for numbers. For example, dates may incorporate rules for numbers that may be limited to certain ranges (e.g., 1-12 for months, 1-31 for days, etc.), and/or may implement rules for formatting the numbers. Similarly, document process 10 may associate sets of rules with times of day that may incorporate rules for numbers that may be limited to certain ranges (e.g., 0-23 for hours, 0-59 for minutes, etc.) in combination with rules for formatting the numbers (e.g., a number in the range of 1-12 separated from a number in the range of 0-59 by a colon, etc.). Further, one or more rules for units of time may also incorporate rules for numbers, e.g., in combination with an expression for a unit of time, such as "days", etc.

Various additional and/or alternative sets of rules may be associated with the various data groups. Additionally, according to an embodiment, the set of rules may include a user editable set of rules. That is, a user (e.g., user 38) may add, remove, and/or edit definitions associated with a data group. For example, a user may edit a definition associated with the numbers data group to include the letter "k" or "K" as an abbreviation indicating one thousand.

Further, document process 10 may process 104 a document to identify elements within the document that adhere to a set of rules. Processing 104 the document may include evaluating elements (e.g., character strings and sets of character strings) included within the document to determine if one or more elements adhere to a set of rules. For example, a user (e.g., user 38) may identify a data group to be searched within a document. Document process 10 may process 104 the document relative to the set of rules associated 102 with the data group identified by the user to identify any elements within the document that belong to the data group identified by the user.

While the present disclosure may be used in connection with any type of document, in one example embodiment the document may include a legal agreement. For example, in the context of a legal agreement, data groups such as numbers, money, units of time, etc., may be particularly important, e.g., for evaluating the terms of the agreement, and the like. In some embodiments, e.g., in which the document may include a legal agreement, certain elements of the document may not be processed 104 to identify elements that adhere to a set of rules. For example, section numbers and the like may not be processed 104 by document process 10.

Figure 3:
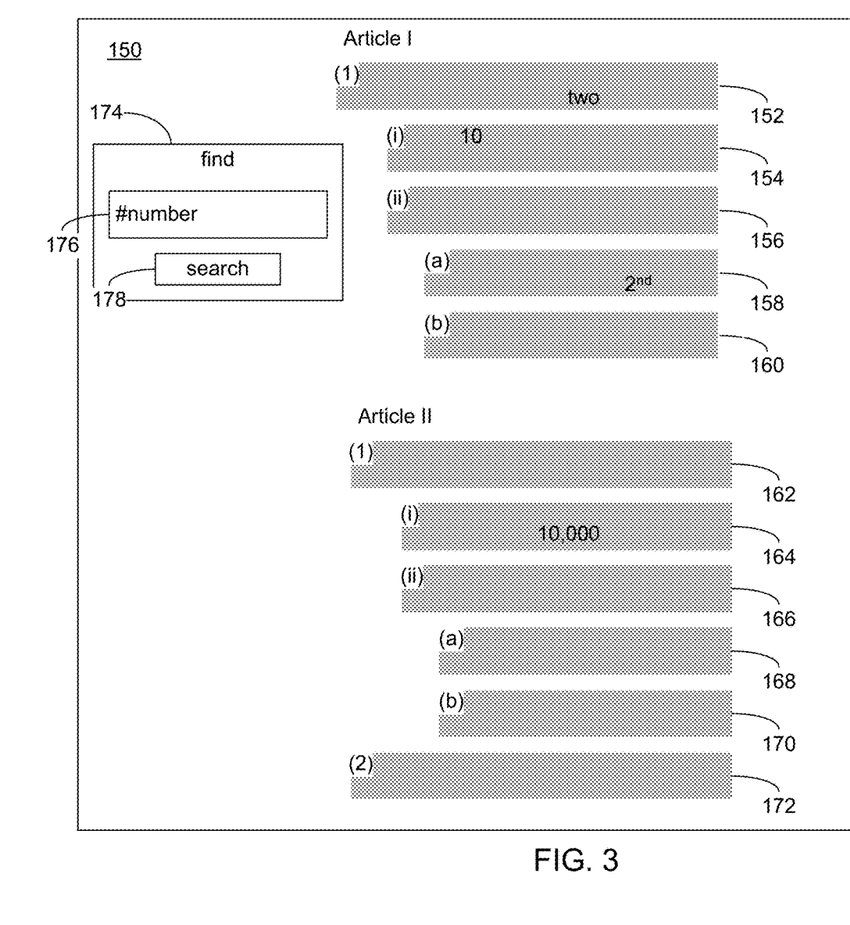
FIG. 3 is a diagrammatic representation of a user interface that may be provided by the document process of FIG. 1 according to an embodiment.

With reference also to FIG. 3, an example user interface 150 is depicted including a portion of a document in the form of a legal agreement. User interface 150 may be provided by document process 10 (e.g., client-side application 10c1, alone and/or in conjunction with another application). The legal agreement may include a plurality of provisions (e.g., provisions 152-172). Additionally, user interface 150 may include search interface 174 which may allow a user (e.g., user 38) to input a desired search term. In an embodiment, document process 10 may process 104 the document to identify elements within the document that adhere to a set of rules in response to user 38 conducting a search for a data group. In some embodiments a search may be conducted for a data group based on a request for a search for a sequence of characters identifying a search group preceded by a sigil character (e.g., # or other suitable characters). Accordingly, user 38 may input a search for a data group (e.g., using a search term "#number" to search for elements within the document adhering to a rule associated 102 with the number data group) in search field 176. It will be appreciated that search terms other than #(data group name) and/or search functionality may be utilized to identify elements within the document that adhere to one or more rules of a data group. It will be appreciated that the user interface depicted and described is intended only for the purpose of illustration, and should not be construed as a limitation as additional and/or alternative user interface and/or user interface features may be utilized.

User 38 may further click the search button 178 (e.g., using an onscreen pointer or the like; not shown). In response to user 38 entering the search term "#number" and clicking search button 178, document process 10 may process 104 the document to identify elements within the document that adhere to one or more rules associated 102 with the number data group.

In an embodiment, document process 10 may provide 106 a graphical indicator associated with elements within the document that adhere to the one or more of the set(s) of rules. The graphical indicator may include, but is not limited to, highlighting the elements that adhere to the one or more of the set(s) of rules, providing a facility to navigate between identified elements, and the like. Continuing with the above-stated example in which a search was conducted relative to the number data group, processing 104 the document may, for example, identify the number "two" in provision 152, the number "10" in provision 154, the number "$2^{nd}$" in provision 158, and the number "10,000" in provision 164. As discussed above, in an embodiment, processing 104 the document may not identify section or provision identifiers (e.g., the provision identifiers associated with provisions 152, 162, and 172).

Figure 4:
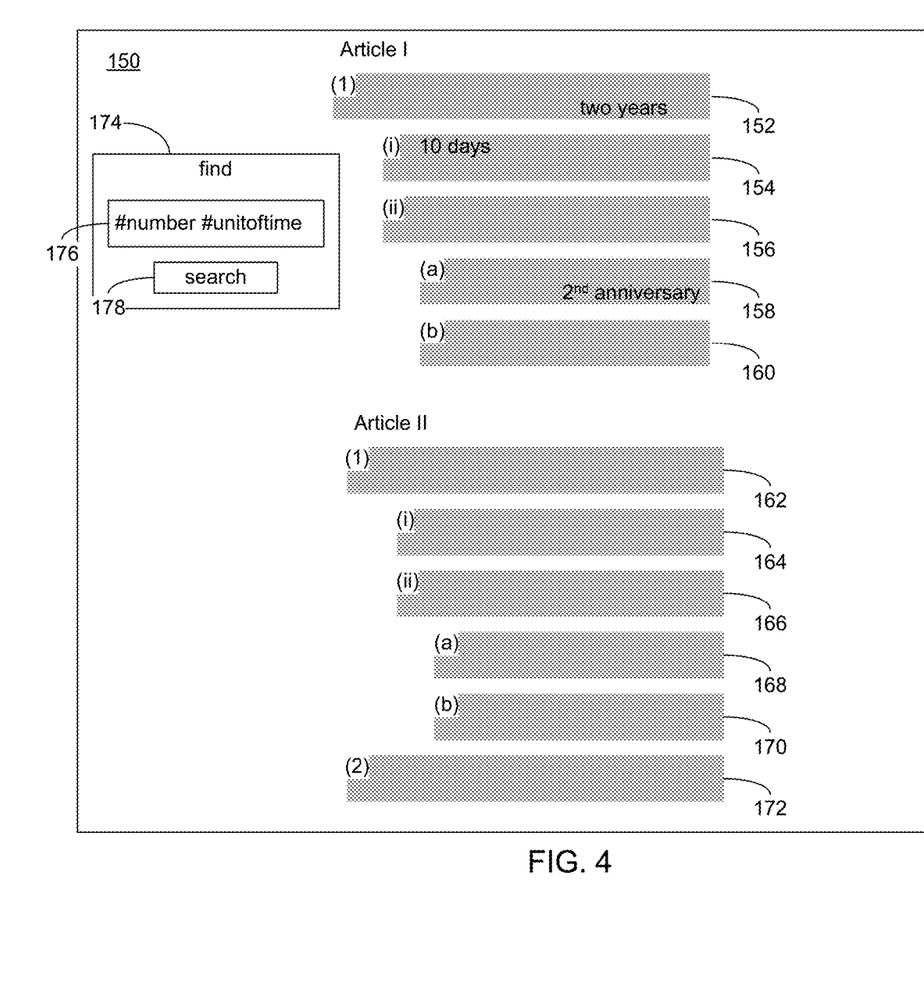
FIG. 4 is a diagrammatic representation of a user interface that may be provided by the document process of FIG. 1 according to an embodiment.

In an example embodiment, processing 104 the document may include processing the document to identify 108 elements that adhere to a combination of two or more sets of rules. For example, and referring to FIG. 4, assume that user 38 may wish to search for all combinations of a number followed by a unit of time. Accordingly, user 38 may enter, into search field 176, a search for the number data group in combination with the unit of time data group (e.g., #number #unitoftime). Upon clicking search button 178, document process 10 may process 104 the document to identify 108 elements within the document that adhere to the one or more rules associated with both the number data group and the unit of time data group. For example, document process may identify 108 the element "two years" within provision 152, in which a string adhering to a rule associated with the number data group (i.e., "two") is within proximity (e.g., within zero to a defined number of characters) to a string adhering to a rule associated with the unit of time data group (i.e., years). In an embodiment, the proximity (e.g., the maximum separation between a string adhering to a rule associated with the number data group and a string associated with the unit of time data group) may be predefined and/or may be user definable and/or variable based on user selection. In some embodiments, the proximity may include one or more white spaces (e.g., space characters) between the strings. Other embodiments may also be utilized. Similarly, as shown in the example of FIG. 4, document process 10 may identify the phrase "10 days" in provision 154, and the phrase "$2^{nd}$ anniversary" within provision 158.

Figure 5:
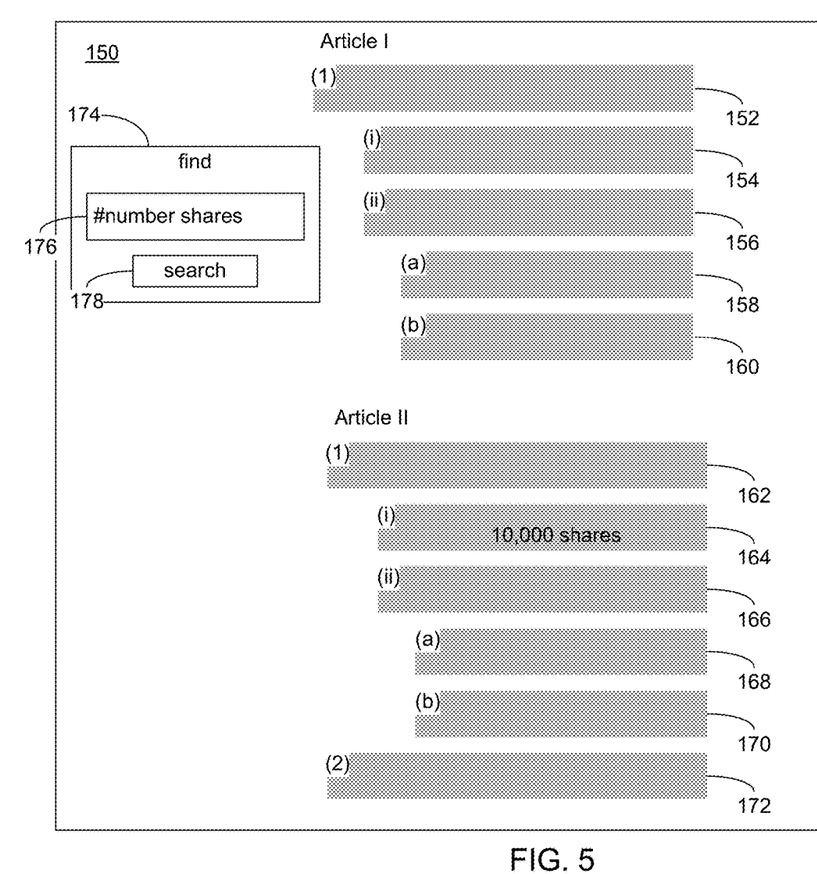
FIG. 5 is a diagrammatic representation of a user interface that may be provided by the document process of FIG. 1 according to an embodiment.

Processing 104 the document may include processing the document to identify 110 elements that adhere to a combination of a set of rules and a user defined search term. For example, and referring also to FIG. 5, assume that user 38 may wish to search the document for a number in combination with the word "shares," (e.g., which may include a number followed by the word shares and/or a number within a given proximity of the word shares). In such an embodiment, user 38 may input, into search field 176, a search for the number data group and the term "shares" (e.g., #number shares). Upon clicking search button 178, document process 10 may process 104 the document to identify 110 elements within the document that adhere to one or more rules associated 102 with the number data group within proximity (e.g., within zero to a defined number of characters, within one or more white spaces, etc.) to the term "shares". In some embodiments, document process 10 may process 104 the document to identify 110 elements within the document that adhere to one or more rules associated 102 with the number data group within proximity to the term "shares" and/or common variations of the term shares, such as the singular "share" (e.g., based on linguistic analysis of the search terms). For example, as shown in FIG. 5, document process 10 may identify 110 the element "10,000 shares" within provision 164. Consistent with the foregoing description, search terms may also be utilized that may include one or more data groups (e.g., that adhere to one or more sets of rules) and one or more user defined search terms in various combinations with one another.

Figure 6:
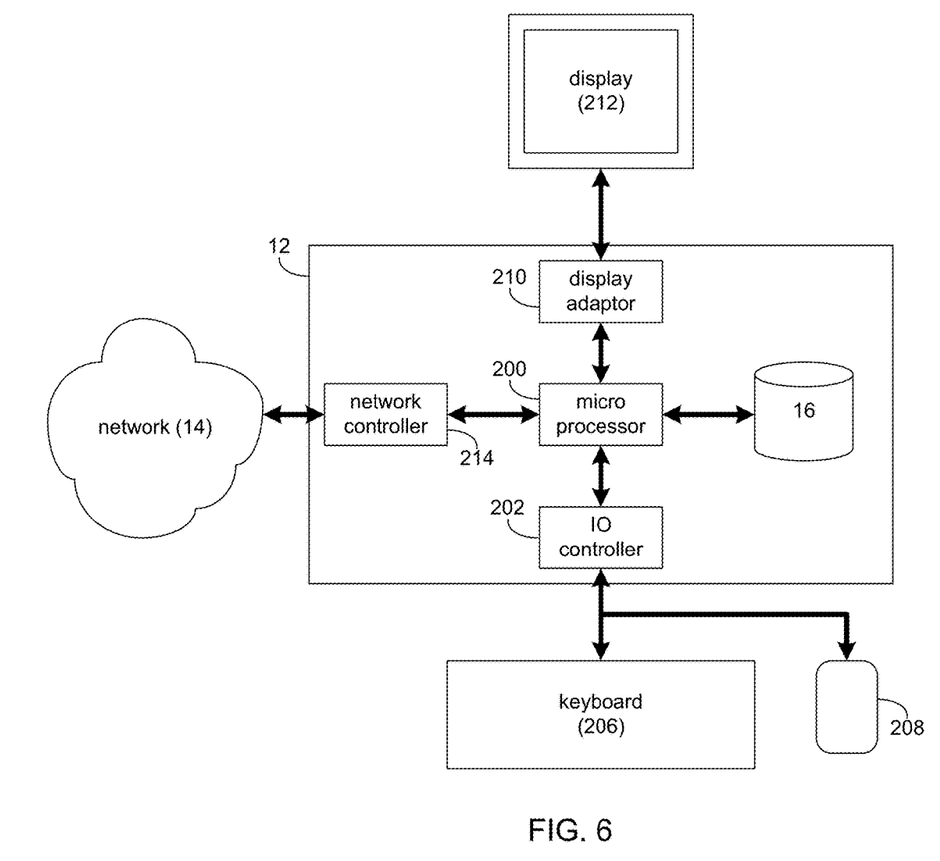
FIG. 6 is a diagrammatic view of the computing device of FIG. 1 according to an embodiment of the present disclosure.

Referring also to FIG. 6, there is shown a diagrammatic view of computing system 12. While computing system 12 is shown in this figure, this is for illustrative purposes only and is not intended to be a limitation of this disclosure, as other configurations are possible. For example, any computing device capable of executing, in whole or in part, event monitoring process 10 may be substituted for computing device 12 within FIG. 6, examples of which may include but are not limited to client electronic devices 28, 30, 32, 34.

Computing system 12 may include microprocessor 200 configured to e.g., process data and execute instructions/code for event monitoring process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 206, mouse 208, USB ports (not shown), and printer ports (not shown). Display adaptor 210 may be configured to couple display 212 (e.g., a CRT or LCD monitor) with microprocessor 200, while network adapter 214 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++, Objective C or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:

defining, on a processor, a plurality of data groups;

associating, on the processor, a set of rules with each of the data groups wherein the set of rules defines examples of items included in each data group;

receiving, on the processor, a user selection including a first data group and at least one of a second data group and one or more user defined search terms to be identified within a document, wherein the user selection is received within a search field, wherein the user selection, including a sequence of characters with a pre-defined data group identifier character, identifies a data group of the plurality of data groups to be identified within the document, wherein the user selection, including a sequence of characters without the pre-defined data group identifier character, identifies the one or more user defined search terms to be identified within the document; and processing, on the processor, the document to identify one or more instances of the first data group and at least one of the second data group and the one or more user defined search terms within the document, processing including:

evaluating one or more elements included within the document to determine if one or more of the elements include a first string adhering to the set of rules associated with the first data group and at least one of a second string adhering to a second rule within the set of rules relative to the second data group and a third string including the one or more user defined search terms, and identifying an element of the one or more elements as an instance of the first data group and at least one of the second data group and the one or more user defined search terms based upon, at least in part, the element including the first string with one or more of the examples of items included in the first data group and at least one of the second string including one or more examples of items included in the second data group and the third string including the one or more user defined search terms, and the first string within a pre-defined proximity, within the document, of at least one of the second string and the third string.

2. The computer-implemented method of claim 1, wherein the data groups include one or more of numbers, dates, times of day, units of time, money, and business entities.

3. The computer-implemented method of claim 1, wherein the set of rules include a user editable set of rules.

4. The computer-implemented method of claim 1, wherein the document includes a legal agreement.

5. The computer-implemented method of claim 1, further comprising providing a graphical indicator associated with elements within the document that adhere to the set of rules.

6. The computer-implemented method of claim 1, wherein each data group is defined with a data group name.

7. The computer-implemented method of claim 6, wherein the user selection including a sequence of characters including a data group name preceded by the pre-defined data group identifier character identifies a data group of the plurality of data groups to be identified within the document.

8. A computer program product residing on a non-transitory computer readable medium having a plurality of instructions stored thereon, which, when executed by a processor cause the processor to perform operations comprising:

defining a plurality of data groups;

associating a set of rules with each of the data groups wherein the set of rules defines examples of items included in each data group;

receiving a user selection including a first data group and at least one of a second data group and one or more user defined search terms to be identified within a document, wherein the user selection is received within a search field, wherein the user selection, including a sequence of characters with a pre-defined data group identifier character, identifies a data group of the plurality of data groups to be identified within the document, wherein the user selection including a sequence of characters without the pre-defined data group identifier character identifies the one or more user defined search terms to be identified within the document; and processing the document to identify one or more instances of the first data group and at least one of the second data group and the one or more user defined search terms within the document, processing including:

evaluating one or more elements included within the document to determine if one or more of the elements include a first string adhering to the set of rules associated with the first data group and at least one of a second string adhering to a second rule within the set of rules relative to the second data group and a third string including the one or more user defined search terms, and identifying an element of the one or more elements as an instance of the first data group and at least one of the second data group and the one or more user defined search terms based upon, at least in part, the element including the first string with one or more of the examples of items included in the first data group and at least one of the second string including one or more examples of items included in the second data group and the third string including the one or more user defined search terms, and the first string within a pre-defined proximity, within the document, of at least one of the second string and the third string.

9. The computer program product of claim 8, wherein the data groups include one or more of numbers, dates, times of day, units of time, money, and business entities.

10. The computer program product of claim 8, wherein the set of rules include a user editable set of rules.

11. The computer program product of claim 8, wherein the document includes a legal agreement.

12. The computer program product of claim 8, further comprising instructions for providing a graphical indicator associated with elements within the document that adhere to the set of rules.

13. The computer program product of claim 8, wherein each data group is defined with a data group name.

14. The computer program product of claim 13, wherein the user selection including a sequence of characters including a data group name preceded by the pre-defined data group identifier character identifies a data group of the plurality of data groups to be identified within the document.

15. A computing system comprising one or more processors configured to:

define a plurality of data groups;

associate a set of rules with each of the data groups wherein the set of rules defines examples of items included in each data group;

receive a user selection including a first data group and at least one of a second data group and one or more user defined search terms to be identified within a document, wherein the user selection is received within a search field, wherein the user selection, including a sequence of characters with a pre-defined data group identifier character, identifies a data group of the plurality of data groups to be identified within the document, wherein the user selection, including a sequence of characters without the pre-defined data group identifier character, identifies the one or more user defined search terms to be identified within the document; and process the document to identify one or more instances of the first data group and at least one of the second data group and the one or more user defined search terms within the document, processing including:

evaluating one or more elements included within the document to determine if one or more of the elements include a first string adhering to the set of rules associated with the first data group and at least one of a second string adhering to a second rule within the set of rules relative to the second data group and a third string including the one or more user defined search terms, and identifying an element of the one or more elements as an instance of the first data group and at least one of the second data group and the one or more user defined search terms based upon, at least in part, the element including the first string with one or more of the examples of items included in the first data group and at least one of the second string including one or more examples of items included in the second data group and the third string including the one or more user defined search terms, and the first string within a pre-defined proximity, within the document, of at least one of the second string and the third string.

16. The computing system of claim 15, wherein the data groups include one or more of numbers, dates, times of day, units of time, money, and business entities.

17. The computing system of claim 15, wherein the set of rules include a user editable set of rules.

18. The computing system of claim 15, wherein the document includes a legal agreement.

19. The computing system of claim 15, wherein the one or more processors are further configured to provide a graphical indicator associated with elements within the document that adhere to the set of rules.

20. The computing system of claim 15, wherein each data group is defined with a data group name.

21. The computing system of claim 20, wherein the user selection including a sequence of characters including a data group name preceded by the pre-defined data group identifier character identifies a data group of the plurality of data groups to be identified within the document.

* * * * *